United States Patent
Hightower

(10) Patent No.: US 9,940,698 B1
(45) Date of Patent: Apr. 10, 2018

(54) CLEANING WRITING BOARDS BASED ON STROKES

(71) Applicant: Konica Minolta Laboratory U.S.A., Inc., San Mateo, CA (US)

(72) Inventor: Ron Hightower, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 0 days.

(21) Appl. No.: 15/282,259

(22) Filed: Sep. 30, 2016

(51) Int. Cl.
*G06K 9/00* (2006.01)
*G06T 5/00* (2006.01)
*G06T 7/00* (2017.01)

(52) U.S. Cl.
CPC ............ *G06T 5/002* (2013.01); *G06T 7/0085* (2013.01); *G06T 2207/10004* (2013.01)

(58) Field of Classification Search
CPC ........... G06K 2209/01; G06K 9/00402; G06K 9/00442; G06K 9/325
USPC ............... 382/190, 194, 214, 260, 274, 275; 345/1.2, 16, 17, 698, 214
See application file for complete search history.

(56) References Cited

U.S. PATENT DOCUMENTS

| | | | |
|---|---|---|---|
| 6,504,956 B1 * | 1/2003 | Gannage ............... | G06F 1/1626 178/18.03 |
| 7,012,611 B2 * | 3/2006 | Anderson ............ | G06K 9/6203 345/539 |
| 7,428,000 B2 * | 9/2008 | Cutler .................. | H04N 7/15 348/14.08 |
| 7,505,178 B2 * | 3/2009 | Erol .................... | G06K 9/00442 358/1.13 |
| 7,770,116 B2 * | 8/2010 | Zhang ............... | G06F 17/30843 345/619 |
| 8,275,197 B2 * | 9/2012 | Hawkins ................. | H04M 3/56 382/165 |
| 2004/0165786 A1 | 8/2004 | Zhang et al. | |

* cited by examiner

*Primary Examiner* — Yosef Kassa
(74) *Attorney, Agent, or Firm* — Osha Liang LLP

(57) ABSTRACT

A method for processing an original image. The method includes: obtaining the original image of a writing board; identifying, within the original image, a first stroke by identifying a first plurality of pixels that exceed at least one intensity threshold; determining a geometric feature of the first stroke; selecting a region of the original image adjacent to the first stroke based on the geometric feature; determining an additional pixel in the region that corresponds to the first stroke; and adding the additional pixel to the first plurality of pixels. The first plurality of pixels correspond to the first stroke.

20 Claims, 7 Drawing Sheets

CLEANING WRITING BOARDS BASED ON STROKES

BACKGROUND

Writing boards such as whiteboards and blackboards are frequently used in many different settings (e.g., academic, corporate, non-profit, residential, etc.). Various content including text, drawings, arrows, tables, charts, and graphs may be drawn or placed on the writing boards for lectures, training, brainstorming sessions, etc. Additionally or alternatively, similar content may be hand-drawn on a sheet of paper.

In order to electronically memorialize these ideas, a photograph of the writing board may be taken or a scan of the sheet of paper may be executed. Further, image processing such as optical character recognition (OCR), stroke recognition, and reconstruction may be executed to extract the contents of the image (i.e., the photograph, the scan, etc.).

The image most likely includes noise. During conversion of the image into an electronically editable format, the noise may be mistaken for actual content of the image. Accordingly, the noise may inadvertently appear in the electronically editable format. This is undesirable. Regardless, users still wish to convert the noisy image into an electronically editable format.

SUMMARY

In general, in one aspect, the invention relates to a method for processing an original image with a processor. The method comprises: obtaining the original image of a writing board; identifying, within the original image, a first stroke by identifying a first plurality of pixels that exceed at least one intensity threshold; determining a geometric feature of the first stroke; selecting a region of the original image adjacent to the first stroke based on the geometric feature; determining an additional pixel in the region that corresponds to the first stroke; and adding the additional pixel to the first plurality of pixels, wherein the plurality of pixels correspond to the first stroke.

In general, in one aspect, the invention relates to a non-transitory computer readable medium (CRM) storing computer readable program code. The computer readable program code: obtains the original image of a writing board; identifies, within the original image, a first stroke by identifying a first plurality of pixels that exceed at least one intensity threshold; determines a geometric feature of the first stroke; selects a region of the original image adjacent to the first stroke based on the geometric feature; determines an additional pixel in the region that corresponds to the first stroke; and adds the additional pixel to the first plurality of pixels, wherein the plurality of pixels correspond to the first stroke.

In general, in one aspect, the invention relates to an image processing apparatus. The image processing apparatus comprises: a memory; and a processor that: obtains the original image of a writing board; identifies, within the original image, a first stroke by identifying a first plurality of pixels that exceed at least one intensity threshold; determines a geometric feature of the first stroke; selects a region of the original image adjacent to the first stroke based on the geometric feature; determines an additional pixel in the region that corresponds to the first stroke; and adds the additional pixel to the first plurality of pixels, wherein the plurality of pixels correspond to the first stroke.

Other aspects of the invention will be apparent from the following description and the appended claims.

DETAILED DESCRIPTION

Figure 1:
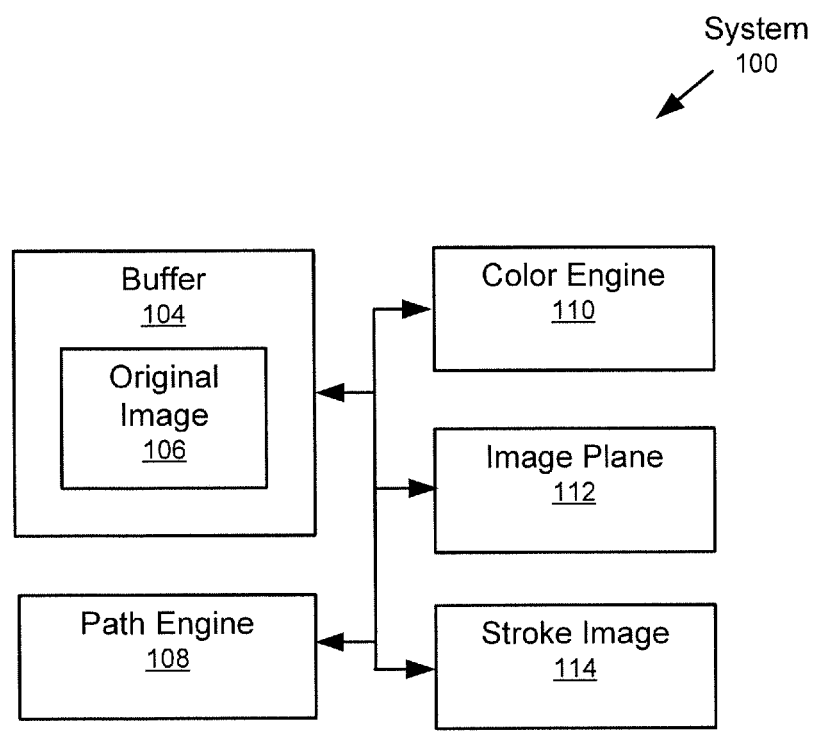
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An original image including one or more strokes and noise is obtained. The original image may be a photograph of a writing board and the strokes may correspond to writings/drawings on the writing board. An edge is detected within the image, and this edge is determined to be part of a stroke (i.e., not noise). A representative color for the stroke may be determined. The stroke may be vectorized by collecting the coordinates of the pixels in the original image corresponding to the stroke. In such embodiments, the portion of the original image including the pixels may be marked as completed. This process may be repeated until all long strokes in the original image have been processed. This vectorization of the stroke, along with the representative color, may be inputs to subsequent processes/algorithms to generate an electronically editable format (e.g., OOXML) of the original image.

Additionally or alternatively, a stroke image may be created. The stroke image may be identical in size to the original image and initially the entire stroke image is a uniform color (e.g., white). The pixels in the stroke image corresponding to the pixels of the stroke in the original image are set to the representative color. This process may be repeated until all long strokes in the original image have processed. The stroke image is effectively a clean version (i.e., less noise) of the original image. The stroke image may be an input to additional processes/algorithms to generate an electronically editable format (e.g., OOXML) of the original image.

Additionally or alternatively, smaller strokes (e.g., strokes corresponding to words or even letters) may be processed differently. An outline of the stroke may be traced based on an estimate of the background near the stroke. A representative color for the stroke may be determined based on the pixels within (i.e., internal to) the outline. A region growing operation may be executed in which faint pixels that are adjacent to pixels corresponding to the stroke may also be classified as pixels corresponding to the stroke. The pixels in the stroke image corresponding to the pixels of the stroke in the original image are then set to the representative color.

FIG. 1 shows a system (100) in accordance with one or more embodiments of the invention. As shown in FIG. 1, the system (100) has multiple components including a buffer (104), a path engine (108), a color engine (110), and image plane (112), and a stroke image (114). Each of these components (104, 108, 110, 112) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (104). The buffer (104) may be implemented in hardware (i.e., circuitry), software, or any combination thereof. The buffer (104) stores an original image (106) having one or more strokes and noise. The strokes may be hand-drawn or machine printed. Some strokes may correspond to a word or a letter. The original image (106) may be a scan of a hardcopy document. The original image (106) may be a digital photograph of a hardcopy document or writing board. Additionally or alternatively, the original image (106) may be downloaded from any source (e.g., website). Further, the original image (106) may be of any size and in any format (e.g., JPEG, GIF, BMP, etc.).

In one or more embodiments, the system (100) includes the color engine (110). The color engine (110) may be implemented in hardware (i.e., circuitry), software, or any combination thereof. The color engine is configured to determine a representative color for a set of pixels. The set of pixels may correspond to a stroke in the original image (106) or part of the stroke. Specifically, the color engine (110) may determine a representative color for the set of pixels by converting to a different color space (e.g., L*a*b*) and then determine one or more statistical modes within that space.

For example, the red-green-blue (R,G,B) values of a pixel can be converted to an (L,a,b) triple, where L is a measure of lightness and the values of (a, b) together specify a lightness-independent hue. Considering all pixels in the set of pixels, the most frequent point in the space of {a,b} (i.e., the statistical mode) is determined. The RGB values of the representative color are calculated such that the (L,a,b) of the representative color match the statistical mode. In one or more embodiments of the invention, a pixel matches the representative color if the (a,b) values of the pixel are similar to (i.e., within a tolerance of) the (a,b) values of the representative color.

In one or more embodiments, the system (100) includes the stroke image (114). The stroke image (114) may be implemented in hardware (i.e., circuitry), software, or any combination thereof. The stroke image (114) may be the same size (i.e., same number of pixels) as the original image (106). Initially, the entire stroke image (114) maybe a uniform color (e.g., white). However, as pixels in the original image (106) are classified as being part of a stroke, the pixels in the stroke image (114) corresponding to these classified pixels in the original image (106) are set to the representative color of the stroke (discussed below). This effectively generates a replica of the original image, but without the noise. In other words, the stroke image (114) is effectively a cleaned version (i.e., less noise) of the original image (106).

In one or more embodiments of the invention, the system (100) includes the image plane (112). The image plane (112) may be implemented in hardware (i.e., circuitry), software, or any combination thereof. The image plane (112) may consist of multiple entries. The image plane (112) may be the same size as the original image (106). In other words, the number of entries in the image plane (112) may match the number of pixels in the original image (106). Initially, all entries may be set to "0" or another default value. In one or more embodiments, the image plane (112) tracks the pixels in the original image (106) that have been processed (discussed below). For example, pixels in the original image (106) that have been processed are flagged in the image plane (112) by setting the entries corresponding to these processed pixels to "1" or another value representing a flagged status.

In one or more embodiments of the invention, the system (100) includes the path engine (108). The path engine (108) may be implemented in hardware (i.e., circuitry), software, or any combination thereof. The path engine (108) may be configured to identifying an edge within the original image (106), determine the edge corresponds to a stroke within the original image (106) (e.g., a stroke on the writing board captured in the original image), and identify additional pixels in the original image (106) corresponding to the stroke.

Those skilled in the art, having the benefit of this detailed description, will appreciate that a stroke drawn by a user on a writing board (or on a sheet of paper) will not have a consistent contrast with the background of the writing board (or sheet of paper). Specifically, a stroke will often start off having a high contrast with the background, but then become faint as the stroke moves across the surface of the whiteboard/paper. These inconsistencies in the contrast are captured in the original image (106).

In one or more embodiments, edge identification includes searching for pixels that are significantly darker than the local background in the original image (106). These significantly darker pixels may correspond to the starting portion of a stroke having the high-contrast with the background. Although the background in the original image (106) may be non-white, non-consistent, and have considerable pixel noise, the intensity of the background pixels will exhibit a consistent trend, and the stroke will exhibit a strong deviation from this trend.

In one or more embodiments of the invention, edge identification includes selecting a column of the original image (106) and then identifying a predetermined number of consecutive pixels (e.g., 3 consecutive pixels) in the column each having an intensity value that exceeds a threshold. For example, the threshold may be 15 levels of intensity above the lightest pixel in the column. As another example, the threshold may be 10 levels of intensity above the average or median pixel intensity in the column. Additionally or alternatively, a row of the original image (106) may be selected and then searched for consecutive pixels each having an intensity value that exceeds a threshold. In one or more embodiments, pixels that have been flagged in the image plane (112) are ignored (i.e., excluded from consideration).

Those skilled in the art, having the benefit of this detailed description, will appreciate that the presence of an edge in the original image (106) does not necessarily indicate the presence of a stroke. For example, the identified edge might actually be noise in the original image (106).

In one or more embodiments of the invention, the path engine (108) determines the edge corresponds to a stroke by searching a neighborhood of the original image for additional high-contrast transitions with an approximately linear arrangement. Finding a linear arrangement suggests that the edge corresponds to a stroke (i.e., not noise). Further, the linear arrangement establishes the direction of travel of the stroke. The lack of a linear arrangement or the lack of additional high-contrast transitions suggests the identified edge is actually noise.

In one or more embodiments of the invention, the path engine (108) identifies additional pixels in the original image (106) corresponding to the stroke. In one or more embodiments of the invention, one or more geometric features (e.g., direction vector, curvature, width, etc.) of the partially-identified stroke are used to select one or more regions of the original image (106) adjacent to the stroke in which additional pixels corresponding to the stroke may exist. Specifically, the regions may be identified by looking ahead (and/or behind) of the current position in the direction of travel of the stroke. This repeats until no regions that agree with the one or more geometric features can be found. In other words, the path engine (108) identifies these regions by following the stroke.

In one or more embodiments, although a pixel may agree with the one or more geometric features of the partially-identified stroke, the pixel is only added to (i.e., included in) the set of pixels corresponding to the stroke if the pixel also has hue-defining values (a,b) that are similar (i.e., within a tolerance) to the hue-defining values of a representative color of the partially-identified stroke. In other words, the pixel is only added if the pixel matches the representative color of the stroke.

In one or more embodiments of the invention, a binary image (not shown) may be generated from the original image (106). The binary image may be used to identify one or more strokes. The binary image may be used as an alternative to edge detection to identify one or more strokes. Those skilled in the art, having the benefit of this detailed description, will appreciate that in generating the binary image (e.g., using a thresholding operation), one or more faint pixels that are actually part of the stroke may be set to the background in the binary image. These faint pixels may be later identified as additional pixels corresponding to the stroke because they agree with the one or more geometric features of the stroke and/or these faint pixels have hue-defining values that are similar to the hue-defining values of a representative color of the partially-identified stroke.

In one or more embodiments of the invention, an identified stroke is initially classified as a long stroke. However, if the stroke fails to exceed a predetermined stroke width, then the stroke is reclassified as a short stroke.

In one to more embodiments of the invention, the path engine (108) is configured to vectorize the stroke by collecting and outputting the coordinates of the pixels corresponding to the stroke. In one or more embodiments of the invention, the path engine (108) is configured to mark a region of the original image (106) comprising the stroke as completed by flagging the pixels corresponding to the stroke in the image plane (112) (discussed above) and/or erasing the pixels corresponding to the stroke in the original image (106). Those skilled in the art, having the benefit of this detailed description, will appreciate that a portion in the original image (106) marked as completed will not be considered in future searches for strokes. In one or more embodiments, the pixels of any identified edges that are later determined to be noise are also marked as completed.

In one or more embodiments of the invention, the path engine (108) processes short strokes differently than long strokes. Moreover, the path engine (108) may process the short strokes after all the long strokes have been processed. Specifically, long strokes are processed as discussed above.

In the case of a short stroke, the path engine (108) is configured to estimate the background of the original image (106) near the stoke (e.g., by using one or more pixels in the row or column immediately before the edge determined to be part of the stroke), and then trace an outline of the stroke (e.g., using the Moore-Neighbor Tracing algorithm) based on the estimated background. The path engine (108) may determine a representative color for the stroke based on the pixels within (i.e., interior to) the outline.

In one or more embodiments, the path engine (108) is configured to execute a region growing operation on the stroke. Specifically, faint pixels that are also adjacent to pixels already deemed to be part of the stroke, are also considered part of the stroke. In other words, these faint pixels are added to the set of pixels deemed to be part of the stroke.

In one or more embodiments of the invention, the path engine (108) is also configured to paint the stroke image (114). In other words, for each identified stroke in the original image (106), the path engine (108) is configured to set the pixels in the stroke image (114) that correspond to the identified stroke to a representative color of the identified stroke.

Although FIG. 1 shows the system (100) as having five components (104, 108, 110, 112, 114), in other embodiments, the system (100) may have more or fewer components. For example, the system (100) may include a converter engine (not shown) that converts the stroke image (114) and/or any vectorized strokes into an editable format (e.g., OOXML). As another example, the system (100) may include addition engines to perform additional processing (e.g., OCR) on the stroke image (114) and/or any vectorized strokes to extract text.

Figure 2:
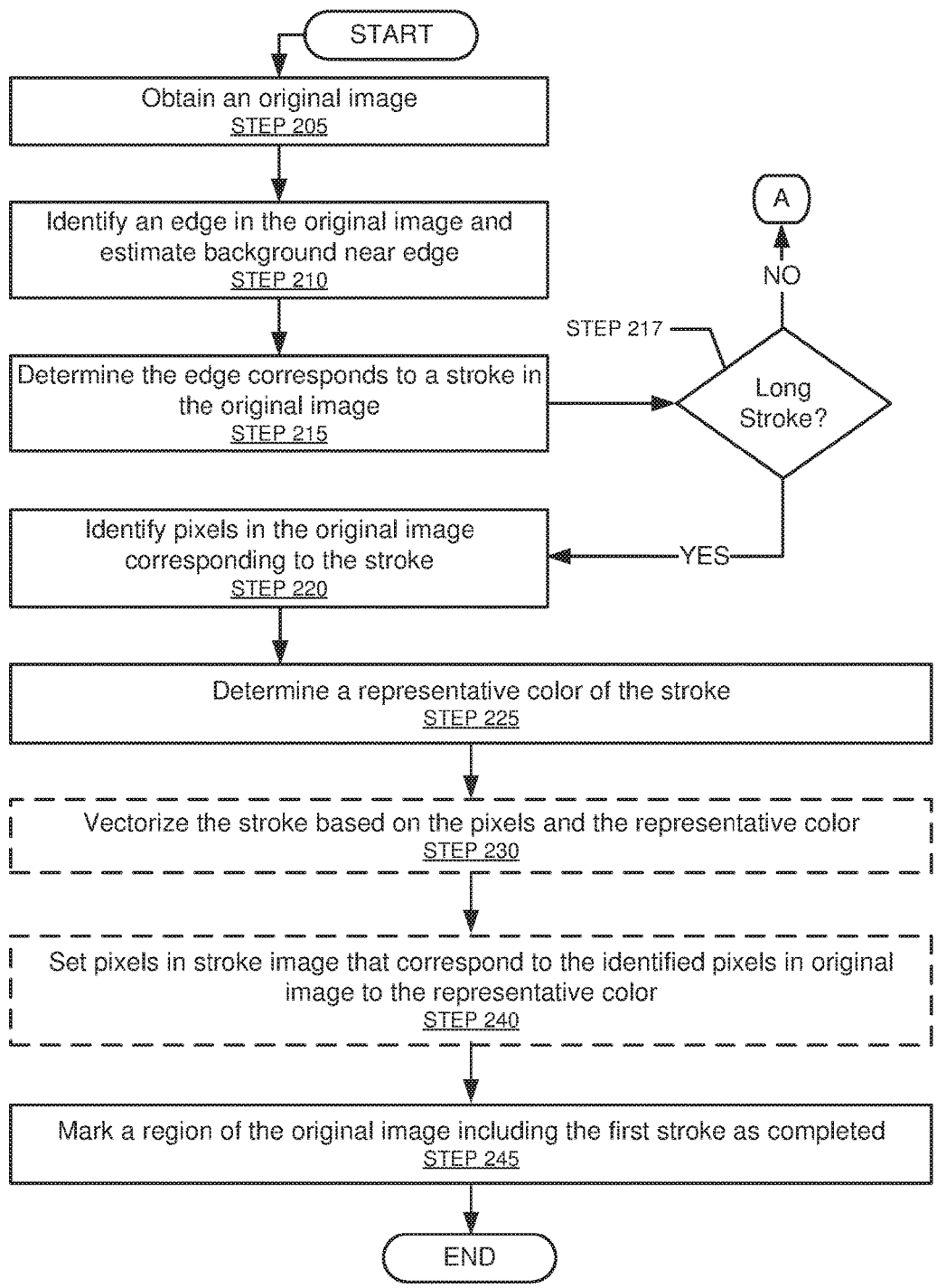
FIGS. 2 and 3 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (104, 108, 110, 112, 114) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an original image is obtained (STEP 205). The original image may be obtained from a digital camera or from a scanner. The original image may be downloaded from a server. The original image may include one or more strokes (e.g., strokes drawn on a whiteboard or sheet of paper). A stroke drawn by a user on a writing board (or on a sheet of paper) will not have a consistent contrast with the background of the writing board (or sheet of paper). Specifically, a stroke will often start off having a high contrast with the background, but then become faint as the stroke moves across the surface of the whiteboard/paper. These inconsistencies in the contrast are captured in the original image. The original image also includes undesirable noise.

In STEP 210, an edge is identified in the original image. Identifying an edge in the original image may include searching for pixels that are significantly darker than the local background in the original image. These significantly darker pixels may correspond to the starting portion of a stroke having the high-contrast with the background. Although the background in the original image may be non-white, non-consistent, and have considerable pixel noise, the intensity of the background pixels will exhibit a consistent trend, and the stroke will exhibit a strong deviation from this trend.

In one or more embodiments of the invention, edge identification includes selecting a column (or row) of the original image and then identifying a predetermined number of consecutive pixels (e.g., 3 consecutive pixels) in the column (or row) each having an intensity value that exceeds a threshold. For example, the threshold may be 15 levels of intensity above the lightest pixel in the column (or row). The selected column may be the first column, middle column, last column, etc. in the original image. The selected column may be chosen at random. The intensity of the background of the original image near the edge may be estimated based on the one or more pixels before the identified consecutive pixels in the column or row.

In STEP 215, it is determined that the edge corresponds to a stroke in the original image. As discussed above, the presence of an edge in the original image does not necessarily indicate the presence of a stroke. For example, the identified edge might actually be noise in the original image.

In one or more embodiments of the invention, it is determined that the identified edge corresponds to a stroke by searching a neighborhood near the edge for additional high-contrast transitions with an approximately linear arrangement. Finding a linear arrangement suggests that the edge corresponds to a stroke. Further, the linear arrangement establishes the direction of travel of the stroke. The lack of a linear arrangement or the lack of additional high-contrast transitions suggests the identified edge is actually noise.

In STEP 217, it is determined whether the stroke is a long stroke or a short stroke. If the stroke exceeds a predetermined number of stroke widths (e.g., 4 stroke widths), the stroke is classified as a long stroke. Otherwise, the stroke may be classified as a short stroke. When it is determined that the stroke is a long stroke, the process proceeds to STEP 220. When it is determined that the stroke is a short stroke, the short stroke is processed using a different process (discussed below in reference to FIG. 3).

In STEP 220, additional pixels in the original image corresponding to the stroke are identified. In one or more embodiments of the invention, one or more geometric features (e.g., direction vector, curvature, width, etc.) of the partially-identified stroke are used to select one or more regions of the original image adjacent to the stroke in which the additional pixels corresponding to the stroke may exist. Specifically, the regions may be identified by looking ahead (and/or behind) of the current position in the direction of travel of the stroke for regions that agree with the one or more geometric features. This repeats until no regions that agree with the one or more geometric features of the stroke can be found. In other words, the regions are identified by effectively following the stroke.

In STEP 225, a representative color for the stroke is determined. In one or more embodiments, the representative color is determined based on identified pixels corresponding to the stroke.

In one or more embodiments, a representative color is determined by calculating multiple hue-defining values for the set of pixels and then determining one or more statistical modes based on the hue-defining values. For example, as discussed above, the red-green-blue (R,G,B) values of a pixel can be converted to an (L,a,b) triple, where L is a measure of lightness and the values of (a,b) together specify a lightness-independent hue. Considering all pixels in the set of pixels, the most frequent point in the space of {a,b} (i.e., the statistical mode) is determined. The RGB values of the representative color are calculated such that the (L,a,b) of the representative color match the statistical mode.

In one or more embodiments, a pixel in a selected region adjacent to the stroke is only considered to be part of the stroke if the pixel matches the representative color of the stroke.

In STEP 230, the identified stroke is vectorized by collecting and outputting the coordinates of the pixels corresponding to the stroke and the representative color of the stroke. The vectorized stroke may be an input to a subsequent process or algorithm involved in converting the original image into an editable format (e.g., OOXML).

In STEP 240, the pixels in a stroke image that correspond to the identified pixels in the original image (i.e., STEP 220) are set to the representative color. As discussed above, the stroke image is effectively a clean version (i.e., less noise) of the original image. The stroke image may be an input to a subsequent process or algorithm involved in converting the original image into an editable format (e.g., OOXML).

In one or more embodiments, if STEP 240 is executed, STEP 230 is omitted. In one or more embodiments, if STEP 230 is executed, STEP 240 is omitted.

In STEP 245, a portion of the original image including the stroke is marked as completed. A portion including any identified noise may also be marked as complete. A portion may be marked as completed by flagging the pixels corresponding to the stroke in an image plane (discussed above). Additionally or alternatively, the portion may be marked as completed by erasing the pixels corresponding to the stroke in the original image. If the pixels are flagged in the image plane and/or if the pixels are erased from the original images, these pixels are ignored (i.e., excluded from consideration) in future iterations of the process depicted in FIG. 2.

One or more steps in the process depicted in FIG. 2 may be repeated until all strokes in a single column, single row, and the entire original image are identified.

Figure 3:
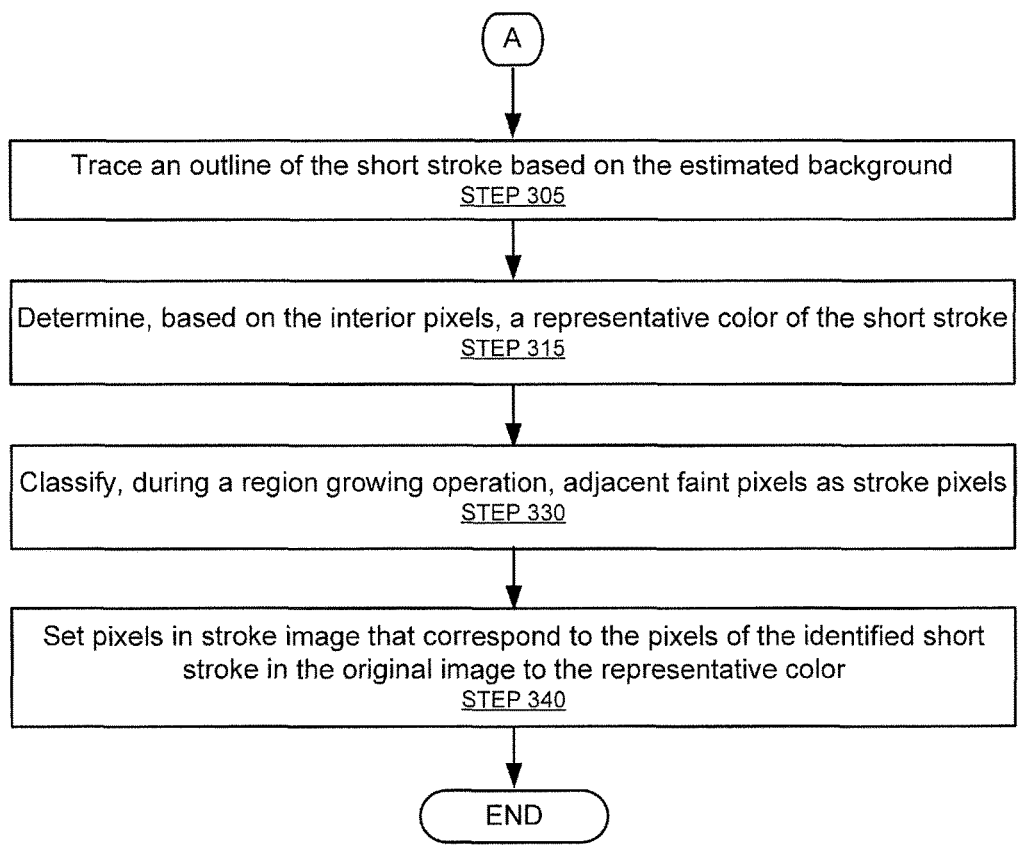

FIG. 3 shows a flowchart in accordance with one or more embodiments of the invention. The flowchart depicts a process for processing a short stroke. One or more of the steps in FIG. 3 may be performed by the components (104, 108, 110, 112, 114) of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. One or more steps of FIG. 3 may be performed after the process in FIG. 2. One or more steps of FIG. 3 may be performed on short strokes in the original image that have been identified using one or more steps of FIG. 2.

Initially, an outline of the short stroke is traced based on the estimated background (e.g., STEP 210 in FIG. 2). In general, tracing the outline includes searching for pixels that are some number of levels darker (e.g., 10 levels, 15 levels, etc.) than the estimated background. The outline may be traced using the Moore-Neighbor Tracing algorithm.

In STEP 315, a representative color is be determined based on the pixels within (i.e., internal to) the outline. As discussed above, the representative color may be determined by calculating multiple hue-defining values for the set of pixels corresponding to the stroke and then determining one or more statistical modes based on the hue-defining values.

In STEP 330, a region growing operation is executed. During this region growing operation, faint pixels adjacent to the identified stroke pixels of STEP 320 may be added to the set of pixels that correspond to the stroke. Specifically, the adjacent faint pixels are absorbed into the set of pixels corresponding to the stroke. In one or more embodiment, STEP 330 is omitted.

In STEP 340, the pixels in a stroke image that correspond to the identified short stroke in the original image are set to the representative color. As discussed above, the stroke image is effectively a clean version (i.e., less noise) of the original image. The stroke image may be an input to a subsequent process or algorithm involved in converting the original image into an editable format (e.g., OOXML).

In one or more embodiments, the process depicted in FIG. 3 may be repeated for each short stroke in the original image. Moreover, the short strokes of the original image may only be processed after all the long strokes have been processed.

Figure 4A:
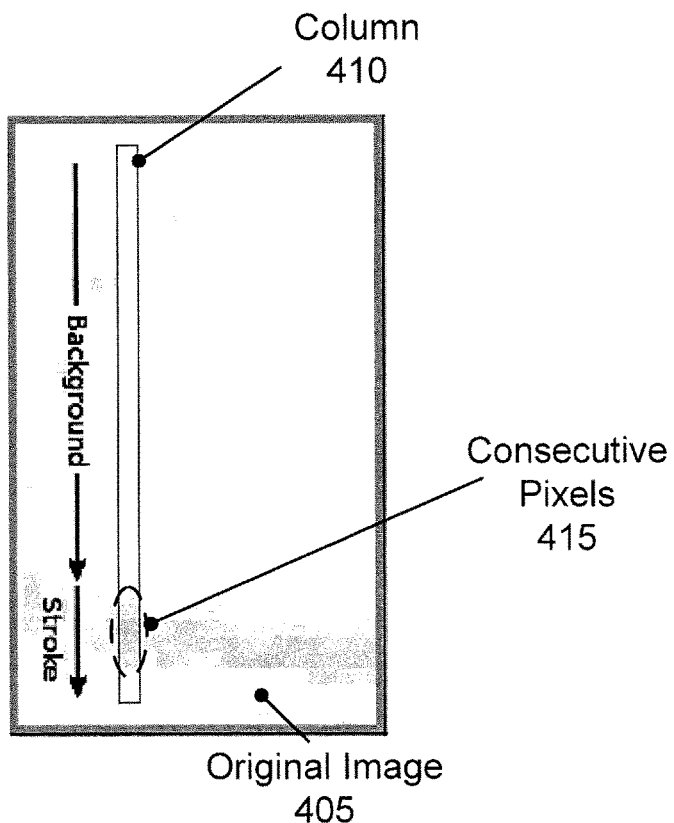
FIGS. 4A-4C show an implementation example in accordance with one or more embodiments of the invention.
Figure 4A:
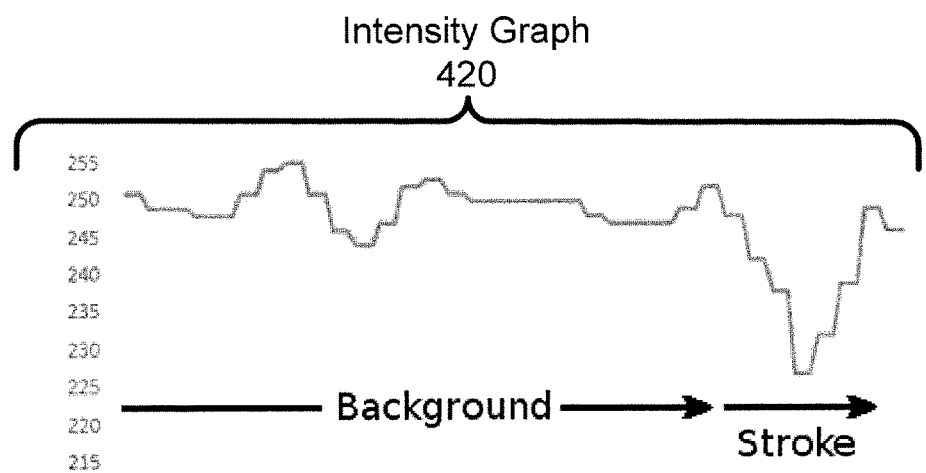
Figure 4B:
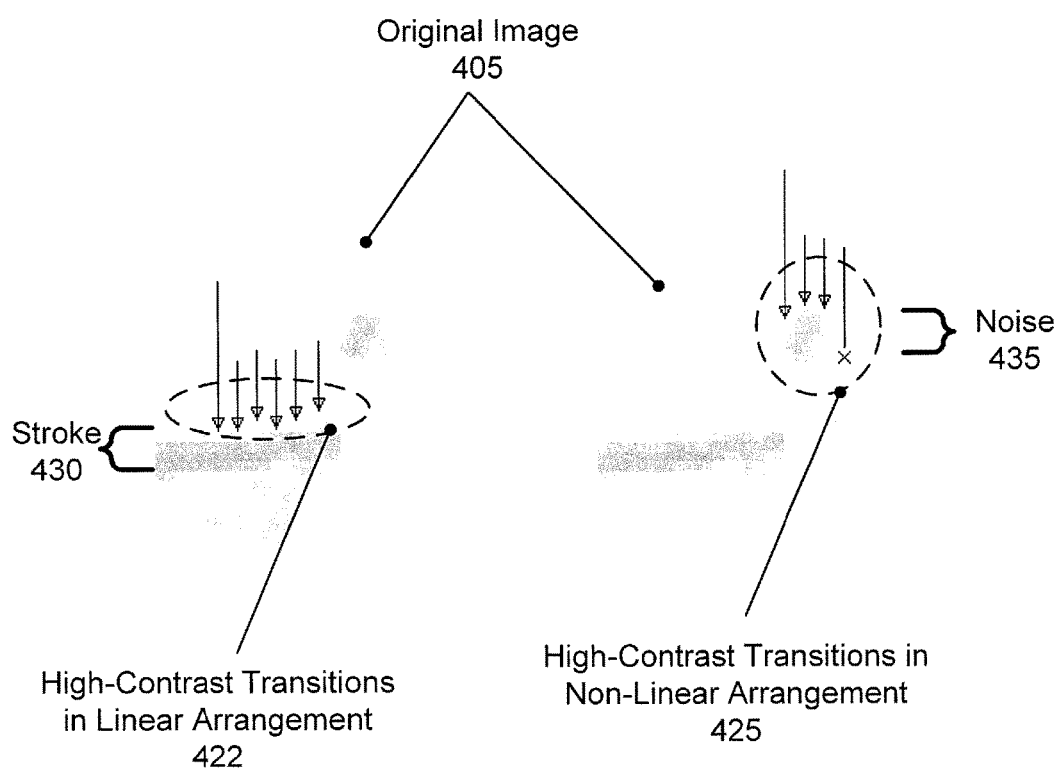
Figure 4C:
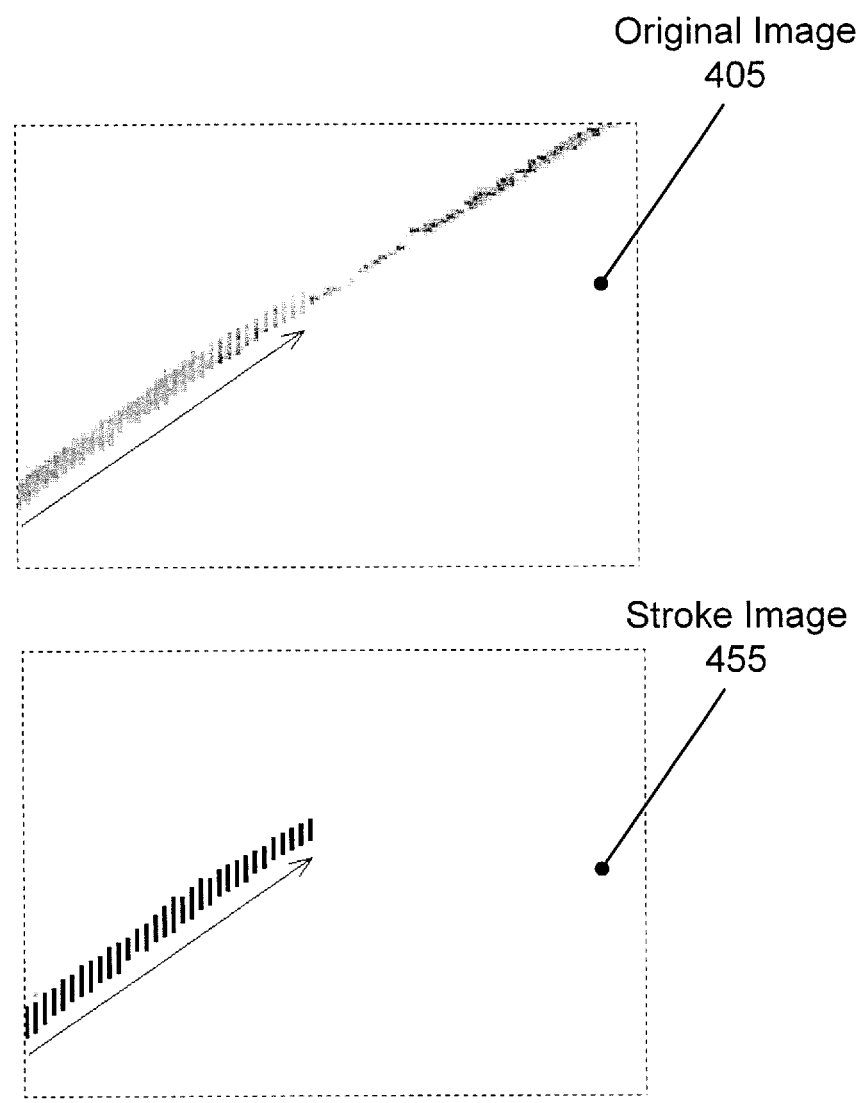

FIGS. 4A-4C show an implementation example in accordance with one or more embodiments of the invention. Specifically, FIG. 4A shows edge identification. In FIG. 4A, there exists an original image (405). Further, a column (410) of the original image (405) has been selected. Within the column (410) several consecutive pixels (415) have been identified. These consecutive pixels (415) each have an intensity value that exceeds a threshold. Accordingly, these consecutive pixels (415) are potentially part of a stroke within the original image (405). Although the background in the original image (405) may be non-white, non-consistent, and have considerable pixel noise, as shown in the intensity graph (420) for the column (410), the intensity of the background pixels will exhibit a consistent trend, and the stroke will exhibit a strong deviation from this trend.

FIG. 4B shows the process for confirming that an identified edge corresponds to a stroke vs. noise. In FIG. 4B, two neighborhoods of high-contrast transitions (422, 425) have been identified within the original image (405). In one neighborhood (422), the high-contrast transitions have a linear arrangement. In the other neighborhood (425), the high-contrast transitions have a non-linear arrangement. The multiple high-contrast transitions with the linear arrangement (422) are indicative of a stroke (430). The multiple high-contrast transitions with the non-linear arrangement (425) are indicative of noise (435).

FIG. 4C show the generation of the stroke image (455). Specifically, the stroke image (455) is generated from the original image (405). The stroke image (455) is a clean version (i.e., less noise) of the original image (405). For each pixel in the original image (405) there is a corresponding pixel in the stroke image (455). Initially, the entire stroke image (455) may be white. As pixels that form a stroke are identified in the original image (405), the corresponding pixels in the stroke image (455) are set to the representative color of the stroke.

One or more embodiments of the invention may have the following advantages: the ability to identify a stroke vs. noise in an original image; the ability to generate a clean version of the original image; the ability to vectorize strokes in the original image; the ability to determine a representative color of a stroke in the original image; the ability to identify an edge in the original image and determine the edge corresponds to a stroke vs. noise; the ability to distinguish pixels corresponding to a stroke vs. pixels corresponding to the background within a bounding box; the ability to add faint adjacent pixels to a set of pixels corresponding to a stroke as part of a region growing operation; the ability of mark a region of the original image as completed using an image plane; etc.

Figure 5:
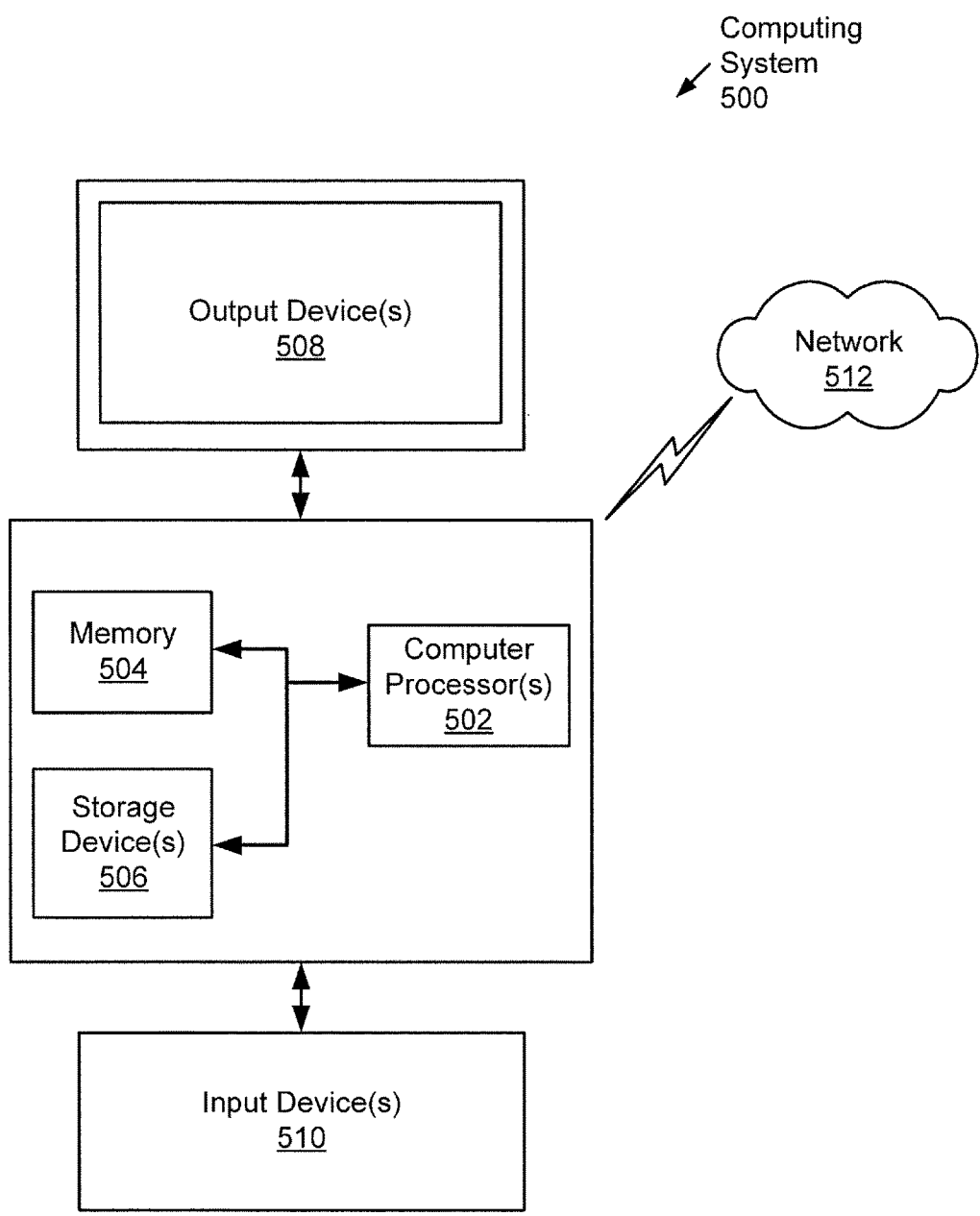
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an original image with a processor, comprising:
   obtaining the original image of a writing board;
   identifying, within the original image, a first stroke by identifying a first plurality of pixels that exceed at least one intensity threshold;
   determining, by the processor, a geometric feature of the first stroke;
   selecting, by the processor, a region of the original image adjacent to the first stroke based on the geometric feature;
   determining, by the processor, an additional pixel in the region that corresponds to the first stroke; and
   adding the additional pixel to the first plurality of pixels, wherein the plurality of pixels correspond to the first stroke.

2. The method of claim 1, wherein the geometric feature is at least one selected from a group consisting of a direction vector of the first stroke, curvature of the first stroke, and width of the first stroke.

3. The method of claim 1, wherein identifying the first stroke comprises:
   identifying a first edge in the original image; and
   determining the first edge is not noise.

4. The method of claim 3, wherein:
   identifying the first edge comprises:
      selecting a column of the original image; and
      searching the column for a predetermined number of consecutive pixels that each satisfy the at least one intensity threshold,
      wherein the first plurality of pixels comprises the predetermined number of consecutive pixels; and
   determining the first edge is not noise comprises:
      searching a neighborhood of the original image comprising the predetermined number of consecutive pixels; and
      identifying a plurality of high-contrast transitions in the neighborhood.

5. The method of claim 4, further comprising:
   vectorizing the first stroke based on the first plurality of pixels;
   marking a portion of the original image comprising the first plurality of pixels as completed;
   identifying a second edge within the original image after marking the portion as completed;
   determining the second edge corresponds to a second stroke on the writing board; and
   identifying a second plurality of pixels in the original image corresponding to the second stroke.

6. The method of claim 5, wherein marking the portion as completed comprises:
   erasing the first plurality of pixels from the original image.

7. The method of claim 5, wherein marking the portion as completed comprises:
   flagging the first plurality of pixels in an image plane.

8. The method of claim 1, further comprising:
   calculating a representative color of the first stroke, wherein determining the additional pixel corresponds to the first stroke comprises determining the additional pixel matches the representative color; and
   setting pixels in a stroke image corresponding to the first plurality of pixels to the representative color.

9. The method of claim 8, wherein calculating the representative color comprises:
   calculating a plurality of hue-defining values for each of the first plurality of pixels; and
   determining a statistical mode based on the plurality of hue-defining values.

10. The method of claim 8, further comprising:
    tracing an outline of a second stroke in the original image;
    determining a representative color for the second stroke based on a second plurality of pixels internal to the outline; and
    setting pixels in the stroke image corresponding to the second plurality of pixels to the representative color for the second stroke.

11. The method of claim 10, further comprising:
    identifying at least one faint pixel adjacent to at least one of the second plurality of pixels; and
    adding the at least one faint pixel to the second plurality of pixels,
    wherein the second stroke is a short stroke.

12. A non-transitory computer readable medium (CRM) storing computer readable program code executed by a processor that:
    obtains the original image of a writing board;
    identifies, within the original image, a first stroke by identifying a first plurality of pixels that exceed at least one intensity threshold;
    determines a geometric feature of the first stroke;
    selects a region of the original image adjacent to the first stroke based on the geometric feature;
    determines an additional pixel in the region that corresponds to the first stroke; and
    adds the additional pixel to the first plurality of pixels, wherein the plurality of pixels correspond to the first stroke.

13. The non-transitory CRM of claim 12, wherein identifying the first stroke comprises:
    identifying a first edge by:
       selecting a column of the original image; and
       searching the column for a predetermined number of consecutive pixels that each satisfy the at least one intensity threshold,
       wherein the first plurality of pixels comprises the predetermined number of consecutive pixels; and
    determining the first edge is not noise by:
       searching a neighborhood of the original image comprising the predetermined number of consecutive pixels; and
       identifying a plurality of high-contrast transitions in the neighborhood.

14. The non-transitory CRM of claim 13, further storing computer readable program code executed by the processor that:
    vectorizes the first stroke based on the first plurality of pixels;
    marks a portion of the original image comprising the first plurality of pixels as completed by executing at least one selected from a group consisting of flagging the first plurality of pixels in an image plane and erasing the first plurality of pixels from the original image;
    identifies a second edge within the original image after marking the portion as completed;
    determines the second edge corresponds to a second stroke on the writing board; and
    identifies a second plurality of pixels in the original image corresponding to the second stroke by following the second stroke.

15. The non-transitory CRM of claim 12, further storing computer readable program code executed by the processor that:
    calculates a plurality of hue-defining values for each of the first plurality of pixels;
    determines a statistical mode based on the plurality of hue-defining values;
    determines a representative color of the first stroke based on the statistical mode,
    wherein determining the additional pixel corresponds to the first stroke comprises determining the additional pixel matches the representative color; and
    sets pixels in a stroke image corresponding to the first plurality of pixels to the representative color.

16. The non-transitory CRM of claim 15, further storing computer readable program code executed by the processor that:
    traces an outline of a second stroke in the original image, wherein the second stroke is a short stroke;
    determines a representative color for the second stroke based on a second plurality of pixels internal to the outline;
    identifies at least one faint pixel adjacent to at least one of the second plurality of pixels;
    adds the at least one faint pixel to the second plurality of pixels; and
    sets pixels in the stroke image corresponding to the second plurality of pixels to the representative color for the second stroke.

17. An image processing apparatus, comprising:
    a memory; and
    a processor that:
        obtains the original image of a writing board;
        identifies, within the original image, a first stroke by identifying a first plurality of pixels that exceed at least one intensity threshold;
        determines a geometric feature of the first stroke;
        selects a region of the original image adjacent to the first stroke based on the geometric feature;
        determines an additional pixel in the region that corresponds to the first stroke; and
        adds the additional pixel to the first plurality of pixels, wherein the plurality of pixels correspond to the first stroke.

18. The image processing apparatus of claim 17, wherein identifying the first stroke comprises:
    identifying a first edge by:
        selecting a column of the original image; and
        searching the column for a predetermined number of consecutive pixels that each satisfy the at least one intensity threshold,
        wherein the first plurality of pixels comprises the predetermined number of consecutive pixels; and
    determining the first edge is not noise by:
        searching a neighborhood of the original image comprising the predetermined number of consecutive pixels; and
        identifying a plurality of high-contrast transitions in the neighborhood.

19. The image processing apparatus of 18, wherein the processor also:
    vectorizes the first stroke based on the first plurality of pixels;
    marks a region of the original image comprising the first stroke as completed by executing at least one selected from a group consisting of flagging the first plurality of pixels in an image plane and erasing the first plurality of pixels from the original image;
    identifies a second edge within the original image after marking the portion as completed;
    determines the second edge corresponds to a second stroke on the writing board; and
    identifies a second plurality of pixels in the original image corresponding to the second stroke by following the second stroke.

20. The image processing apparatus of claim 17, wherein the processor also:
    calculates a plurality of hue-defining values for each of the first plurality of pixels;
    determines a statistical mode based on the plurality of hue-defining values;
    determines a representative color of the first stroke based on the statistical mode,
    wherein determining the additional pixel corresponds to the first stroke comprises determining the additional pixel matches the representative color;
    sets pixels in a stroke image corresponding to the first plurality of pixels to the representative color;
    traces an outline of a second stroke in the original image, wherein the second stroke is a short stroke;
    determines a representative color for the second stroke based on a second plurality of pixels internal to the outline;
    identifies at least one faint pixel adjacent to at least one of the second plurality of pixels;
    adds the at least one faint pixel to the second plurality of pixels; and
    sets pixels in the stroke image corresponding to the second plurality of pixels to the representative color for the second stroke.

\* \* \* \* \*